＊US010808614B2

(12) United States Patent
Jones et al.

(10) Patent No.: US 10,808,614 B2
(45) Date of Patent: Oct. 20, 2020

(54) RADIAL FLOW TURBINE HEAT ENGINE

(71) Applicant: HiETA TECHNOLOGIES LIMITED, Bristol (GB)

(72) Inventors: Simon Lloyd Jones, Bristol (GB); Drummond Watson Hislop, Bristol (GB); Keith Robert Pullen, Bristol (GB)

(73) Assignee: HiETA Technologies Limited, Bristol (GB)

( * ) Notice: Subject to any disclaimer, the term of this patent is extended or adjusted under 35 U.S.C. 154(b) by 155 days.

(21) Appl. No.: 16/302,784

(22) PCT Filed: Mar. 24, 2017

(86) PCT No.: PCT/GB2017/050843
§ 371 (c)(1),
(2) Date: Nov. 19, 2018

(87) PCT Pub. No.: WO2017/212211
PCT Pub. Date: Dec. 14, 2017

(65) Prior Publication Data
US 2019/0292984 A1 Sep. 26, 2019

(30) Foreign Application Priority Data
Jun. 9, 2016 (GB) .................................. 1610089.3

(51) Int. Cl.
F02C 7/08 (2006.01)
F02C 7/10 (2006.01)
(Continued)

(52) U.S. Cl.
CPC .................. F02C 7/10 (2013.01); F02C 3/05 (2013.01); F02C 3/085 (2013.01); F02C 3/14 (2013.01);
(Continued)

(58) Field of Classification Search
CPC .... F02C 3/05; F02C 3/085; F02C 7/08; F02C 7/10; F02C 3/062; F02C 3/09;
(Continued)

(56) References Cited

U.S. PATENT DOCUMENTS 2,476,179 A * 7/1949 Cameron .................. F02C 7/08
165/145
2,542,628 A * 2/1951 Christopher ............ F02C 3/085
60/248

(Continued)

FOREIGN PATENT DOCUMENTS

DE        2051913 A1 * 4/1972 .............. F02K 3/115
DE    102004030325 A1 * 1/2006 ................ F02C 7/10
(Continued)

OTHER PUBLICATIONS

International Search Report and Written Opinion of the ISA for PCT/GB2017/050843 dated Jun. 19, 2017, 10 pages.
Search Report for GB1610089.3 dated Nov. 9, 2016, 4 pages.

Primary Examiner — Gerald L Sung
Assistant Examiner — Marc J Amar
(74) Attorney, Agent, or Firm — Nixon & Vanderhye P.C.

(57) ABSTRACT

A radial flow turbine heat engine includes a compressor, a recuperator, a combustor and a turbine. A compressor outlet manifold collects compressed gas from the compressor through a plurality of compressor outlets. A turbine inlet manifold supplies combustion gas to the turbine through a plurality of turbine inlets. The compressor outlet manifold comprises a plurality of compressor outlet manifold ducts and the turbine inlet manifold comprises a plurality of turbine inlet manifold ducts. These manifold ducts are circumferentially interdigitated with respect of each other around the shaft of the turbine to provide a flow path for compressed gas through the recuperator located radially inwardly with respect to the rotation axis of the shaft (Continued)

Figure 1:
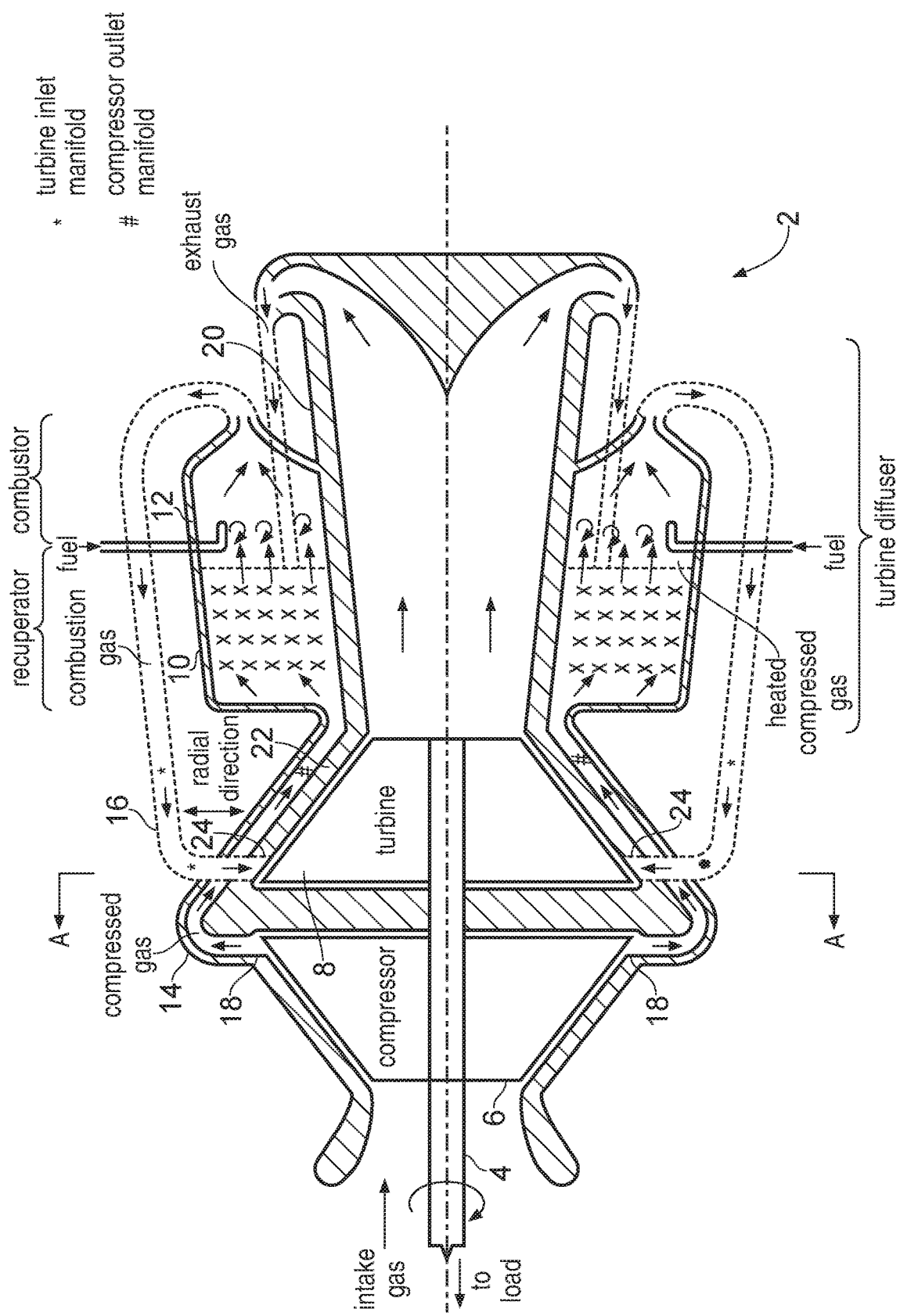

FIG. 1 compared to the flow path for the combustion gas in the hot side portion of the heat engine. Furthermore, a flow path for the combustion gas is provided to the turbine inlets which are radially inward with respect to the rotation axis of the shaft compared to flow paths for the compressed gas within the compressor outlet manifold proximal to those turbine inlets.

21 Claims, 5 Drawing Sheets

(51) Int. Cl.
  *F02C 3/05*    (2006.01)
  *F02C 3/14*    (2006.01)
  *F02C 3/08*    (2006.01)
(52) U.S. Cl.
  CPC ......... *F05D 2260/20* (2013.01); *Y02T 50/671* (2013.01)
(58) Field of Classification Search
  CPC .............. F02C 3/103; F02D 2260/972; F02D 2210/42; F02D 2210/43; F01D 1/06; F01D 1/14; F01D 1/22; F01D 1/28; F01D 3/025; F01D 5/04–048; F01D 9/026; F01D 9/045; F01D 17/146; F01D 17/165
  See application file for complete search history.

(56) References Cited

U.S. PATENT DOCUMENTS

| | | | | |
|---|---|---|---|---|
| 3,201,938 A | * | 8/1965 | Zirin | F02C 7/08 60/39.511 |
| 3,222,864 A | * | 12/1965 | Dyste | F28D 7/163 60/39.511 |
| 3,267,673 A | * | 8/1966 | Hemsworth | F02C 7/08 60/39.511 |
| 3,626,694 A | * | 12/1971 | Holste | F01D 1/06 60/793 |
| 5,079,911 A | | 1/1992 | Kumakura | |
| 5,253,472 A | | 10/1993 | Dev | |
| 5,337,567 A | | 9/1994 | Loving | |
| 6,430,917 B1 | | 8/2002 | Platts | |
| 7,044,718 B1 | | 5/2006 | Platts | |
| 7,775,031 B2 | * | 8/2010 | Wood | F02C 7/10 165/4 |
| 8,181,443 B2 | * | 5/2012 | Rago | F28D 9/0018 60/772 |
| 9,587,561 B2 | * | 3/2017 | Snyder | F02C 7/18 |
| 2002/0020168 A1 | * | 2/2002 | Boeck | F28D 21/0003 60/266 |
| 2002/0152754 A1 | * | 10/2002 | MacKay | F02C 6/003 60/772 |
| 2003/0163993 A1 | * | 9/2003 | Douglas | F02C 6/00 60/772 |
| 2005/0235626 A1 | * | 10/2005 | Hull | F02C 7/10 60/39.511 |
| 2005/0235627 A1 | * | 10/2005 | Vandermolen | F02C 7/10 60/39.511 |
| 2011/0097189 A1 | * | 4/2011 | Sandoval | F02C 7/08 415/68 |
| 2012/0216543 A1 | * | 8/2012 | Eleftheriou | F28D 9/0018 60/772 |
| 2013/0236299 A1 | * | 9/2013 | Kington | F28F 9/0263 415/177 |
| 2016/0047310 A1 | * | 2/2016 | Tanimura | F01D 25/10 60/39.511 |
| 2018/0313269 A1 | * | 11/2018 | Macchia | F02C 7/10 |

FOREIGN PATENT DOCUMENTS

| | | | | |
|---|---|---|---|---|
| EP | 2 433 080 | | 3/2012 | |
| EP | 2 725 197 | | 4/2014 | |
| GB | 568661 A | * | 4/1945 | .............. F02C 3/085 |
| GB | 576094 A | * | 3/1946 | ......... F28D 21/0003 |
| GB | 578686 A | * | 7/1946 | ................ F02C 7/10 |
| GB | 695891 | | 8/1953 | |
| GB | 908211 A | * | 10/1962 | ................ F28C 3/14 |

\* cited by examiner

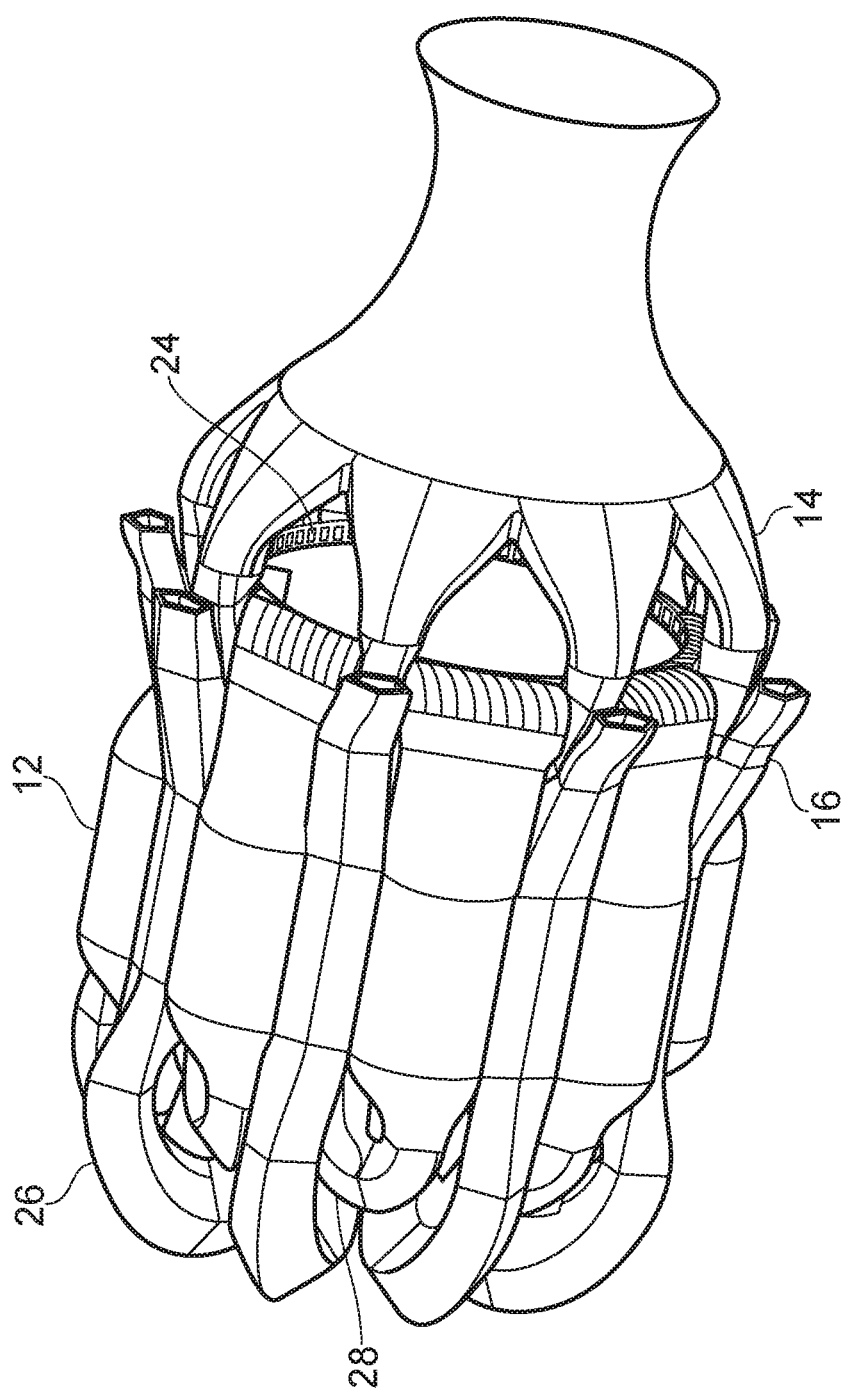

RADIAL FLOW TURBINE HEAT ENGINE

This application is the U.S. national phase of International Application No. PCT/GB2017/050843 filed Mar. 24, 2017 which designated the U.S. and claims priority to GB Patent Application No. 1610089.3 filed Jun. 9, 2016, the entire contents of each of which are hereby incorporated by reference.

This disclosure relates to a radial flow turbine heat engine. More particularly, this disclosure relates to an arrangement of components within a radial flow turbine heat engine which includes a recuperator.

It is known to provide radial flow turbine heat engines for combusting fuel to do work, such as, for example, driving an electrical generator. Large scale turbine heat engines are typically used in applications such as power stations and aircraft or marine propulsion. Small scale or micro turbines with a lower power output are desirable in other applications, such as to provide backup electrical charging (range extending) within an electric vehicle. Micro turbines have the advantage of being relatively compact and light compared to an internal combustion engine with a similar power outlet. A problem with such micro turbines is improving their efficiency whilst at the same time maintaining their compact dimensions and low weight. Furthermore, it is desirable that such micro turbines should be relative inexpensive to manufacture.

Viewed from one aspect the present disclosure provides a radial flow turbine heat engine comprising:

a shaft;

a compressor coupled to said shaft to compress intake gas to form compressed gas;

a recuperator to heat said compressed gas to form heated compressed gas;

a combustor to mix said heated compressed gas with fuel and to combust said fuel and said heated compressed gas to form combustion gas;

a turbine coupled to said shaft to expand said combustion gas to form exhaust gas;

a compressor outlet manifold to collect said compressed gas from said compressor through a plurality of compressor outlets; and a turbine inlet manifold to supply said combustion gas to said turbine through a plurality of turbine inlets; wherein said compressor outlet manifold comprises a plurality of compressor outlet manifold ducts connected to said plurality of compressor outlets;

said turbine inlet manifold comprises a plurality of turbine inlet manifold ducts connected to said plurality of turbine inlets; and said plurality of compressor outlet manifold ducts are circumferentially interdigitated with said plurality of turbine inlet manifold ducts around said shaft to provide:

(i) flow paths for said compressed gas through said recuperator located radially inward with respect to a rotation axis of said shaft relative to flow paths for said combustion gas in a portion of said radial flow turbine proximal to said turbine; and (ii) flow paths for said combustion gas to said plurality of turbine inlets located radially inward with respect to said rotation axis relative to flow paths for said compressed gas proximal to said plurality of turbine inlets.

The present disclosure provides a manifolding arrangement for the compressor and the turbine which permits the compressed gas to be routed close to the portion(s) of the turbine where it may be heated, such as by use of a recuperator and/or by absorbing heat from the turbine casing, whilst at the same time permitting the combustion gas to be routed to the turbine. The present disclosure recognizes that as the ducts for routing the gas move radially outwardly from the shaft of the turbine, they need not continue to increase in cross-sectional area and may be split into multiple ducts thereby providing gaps between these multiple ducts to allow a crossover between which one of the compressor outlet manifold ducts and the turbine inlet manifold ducts are radially innermost and radially outermost. In this way, the compact and lightweight form of the turbine may be retained whilst permitting a flow path for the compressed gas which allows efficient heating of the compressed gas to form heated compressed gas prior to combustion thereby increasing the turbine efficiency. The gas flowing out of the compressor and in to the turbine may have components of its flow which are other than radial, e.g. tangential and/or axial to match a swirling flow within the turbine or compressor.

It will be appreciated that a radial flow turbine heat engine may utilize gas flow directions from the compressor to the turbine which are not purely radial in direction and may include some axial component of flow at the compression output and/or at the turbine inlet. Such arrangements are still radial flow turbine heat engines in which the compressed gas has a flow path with a gas flow component radially output from the compressor and the combustion gas has a flow path with a gas flow component radially inward toward the turbine.

In at least some embodiments a diffuser is provided to receive exhaust gas from the turbine and to expand this exhaust gas. Such a diffuser can assist in improving the efficiency of the turbine by changing the temperature and pressure of the exhaust gas leaving the diffuser. Such a diffuser will typically become heated during operation of the turbine and the manifolding arrangement of the present disclosure assists in allowing the recuperator to be positioned to abut and at least partially surround the diffuser so as to receive heat from the diffuser and to permit the recuperator to be located radially inwardly of the flow paths for the combustion gas provided by the turbine inlet manifold. A further advantage of this arrangement is that lagging need not be separately provided for the recuperator and the turbine inlet manifold as heat passing from the recuperator into the turbine inlet manifold will serve to further increase the combustion gas temperature in an advantageous manner and accordingly lagging may simply be provided radially outwardly of the turbine inlet manifold.

In addition to receiving heat conducted from the diffuser, the recuperator may also receive exhaust gas from the turbine diffuser and transfer heat from that exhaust gas to the compressed gas to form the heated compressed gas. In practice, such heat transfer from the exhaust gas to the compressed gas may be the primary mechanism by which the recuperator heats the compressed gas to form the heated compressed gas. Nevertheless, the additional heat transfer provided by disposing the recuperator to abut the diffuser so that it may be absorb heat (e.g. by conduction and radiation) from the diffuser is advantageous and further improves the efficiency of the turbine. In some embodiments, the recuperator may be annular and completely surround the diffuser. Such embodiments may permit an increased amount of heat to pass from the diffuser to the recuperator by conduction.

In other embodiments the recuperator may comprise a plurality of separate recuperator portions disposed around a circumference of the turbine diffuser. This can provide a potentially better flow path match with the plurality of compressor outlet manifold ducts, such as, for example, separate compressor output manifold ducts supplying compressed gas to respective ones of the separate recuperator portions. The gaps between the recuperator portions may serve to house separate combustor portions in a manner which helps preserve the compact dimensions of the turbine as a whole. Furthermore, heat from the combustor portions may pass by conduction into the adjacent recuperator portions which surround the combustor portions in the circumferential direction thereby reducing energy lost from the system as a whole due to conduction out of the combustor portions.

In other embodiments the combustor may be disposed on an axis of the shaft proximal to the output end of the turbine diffuser rather than surrounding the turbine diffuser.

The manifolding arrangements of the proposed techniques allow the compressed gas leaving the compressor to follow a flow path which is radially inwards of the flow path of the combustion gas in the portion of the heat engine proximal to the turbine. This allows, in some embodiments, the compressed gas to be flowed through the turbine casing surrounding the rotating turbine, or through ducts which abut this turbine casing. Thus, heat may be transferred from the turbine casing to the compressed gas in a way which increases the efficiency of the turbine. Furthermore, removing heat from the turbine casing by cooling it with the compressed gas may ease design constraints upon the turbine casing, such as, for example, allowing a less expensive material to be used for the turbine casing as its peak temperature will be less.

The combustor may have a variety of different forms. For example, the combustor could be located on the center axis of the shaft on the opposite side to the diffuser from the turbine. However, a more compact design may be achieved when the combustor surrounds the shaft in a similar manner to the recuperator (e.g. with an annular form or a form corresponding to a plurality of circumferentially arranged combustor portions) and receives the heated compressed gas from an outlet(s) portion of the recuperator that is distal from the turbine (furthest from the turbine).

The circumferential interdigitation of the compressor outlet manifold ducts and the turbine inlet manifold ducts allows a crossover between which of these is radially innermost/outermost to be achieved whilst not significantly impeding gas flow. The interdigitation may be arranged in a variety of different ways and need not necessarily correspond to a 1:1 interdigitation, i.e. strictly alternating compressor outlet manifold ducts and turbine inlet manifold ducts when progressing around the circumference of the turbine relative to the rotating shaft. For example, the ducts of each type may be paired and interdigitated to provide a 2:2 arrangement whereby a pair of compressor outlet manifold ducts are followed by a pair of turbine inlet manifold ducts and then a next pair of compressor outlet manifold ducts etc. It is also possible that the number of compressor outlet manifold ducts need not equal the number of turbine inlet manifold ducts. For example, a 2:1 interdigitation might be used whereby a pair or compressor outlet manifold ducts is followed in the circumferential direction by a single turbine inlet manifold ducts which is then followed by another pair or compressor outlet manifold ducts etc.

Given that the compressor will naturally expel compressed gas around its complete periphery, and the turbine will typically input combustion gas around its complete periphery, it will generally produce a gas flow with less requirement to redirect the flow if a relatively large number of ducts evenly spaced around the periphery are provided with these ducts being correspondingly smaller in cross sectional area. However, a balance is necessary as the flow path resistance will typically be greater in smaller ducts and accordingly embodiments with too great a number of interdigitated ducts will start to lose overall efficiency. There is also an issue that it may be more difficult/expensive to manufacture a heat engine with a large number of small ducts compared to a smaller number of large ducts (although this may not be a problem with additive manufacturing techniques). There is also a potential problem with pressure loss due to a higher surface area when a large number of small ducts are used.

A convenient flow path direction for the compressed gas is one in which the compressor outlet manifold ducts direct the compressed gas to flow radially outwardly from the shaft and then away from the compressor towards the turbine (i.e. with a component along the shaft axis). In a similar way, the turbine inlet manifold ducts may be arranged to direct the combustion gas to flow toward the turbine (i.e. with a component along the shaft axis) and then radially inwardly toward the shaft.

As previously explained, the manifolding arrangement of the present disclosure permits which of the compressor outlet manifold ducts and the turbine inlet manifold ducts are radially innermost to be switched in a manner which can then be exploited to permit more heat to be recovered into the compressed gas from the turbine. The physical space available where the ducts crossover may be limited as it is desired to keep the turbine with small overall dimensions and accordingly not route the ducts too far radially outwardly from the shaft. In this context, overall better use of the space available may be achieved when the compressor outlet manifold ducts have a total cross-sectional area that is less than that of the turbine inlet manifold ducts where the crossover occurs. The combustion gas is hotter than the compressed gas and so providing more cross sectional area within which the combustion gas may flow is an overall better use of the available area in keeping the gas flow resistance of the turbine as a whole low.

The compressor outputs the compressed gas with a radially outward flow component. The compressed gas may also have a rotational component as it is output from the compressor. The efficiency with which the compressor outlet manifold ducts collect the compressed gas (keep the flow resistance low) may be improved in embodiments in which the compressor outlet manifold ducts have a central axis at the compressor outlet that is aligned with the direction of outflow of the compressed gas at those outlets.

Aligning the compressor outlet manifold ducts to the flow direction of the compressed gas at the compressor outlets may permit the compressor outlet manifold ducts in some embodiments to serve as a diffuser which collects the compressed gas and so avoid the need for the separate provision of a diffuser at the compressed gas outlets of the compressor. The action of the compressor outlet manifold ducts as a diffuser may be further enhanced in some embodiments by the provision of flow directing vanes within at least a first portion of the compressor outlet manifold ducts.

In a similar manner as discussed above in relation to the output of the compressed gas for the compressor, the turbine inlet manifold ducts may be arranged to have a central axis at the turbine inlets which is aligned to provide a direction of inflow of the combustion gas which has a rotational component around the shaft in a direction corresponding to a rotation direction of the turbine and thereby matched to the turbine motion. Thus, the turbine inlet manifold ducts may in some embodiments serve as nozzles to inject the combustion gas into the turbine at the appropriate angle thereby avoiding the need for the separate provision of nozzles at the turbine inlets. The turbine inlet manifold ducts may have their ability to serve as nozzles enhanced by the provision, for example, of flow directing vanes within at least the portion of the turbine inlet manifold ducts next to the turbine inlets.

As previously mentioned above, the combustor may receive the heated compressed gas directly from the recuperator. The efficiency of fuel burning within the combustor may be improved by arranging that the flow ducts through the recuperator are shaped to provide that the input to the combustor has a swirl component of flow.

Whilst it would be possible to form the various components of the turbine in a variety of different manners, such as forming them as discrete separate components made of different materials, the arrangement of the present disclosure is particularly suited to enabling embodiments in the which the recuperator, the combustor, the turbine inlet manifold, and at least a portion of the compressor outlet manifold are integrally formed. This combination of components may, for example, be integrally formed of a consolidated material, such as by additive manufacture. As an example, energy beam melting of metal powder, such as a titanium alloy or another metal alloy in a power bed additive manufacture machine, may be used to form the integrated component.

The additive manufacture process may be controlled by supplying an electronic design file which represents characteristics of the design to be manufactured, and inputting the design file to a computer which translates the design file into instructions supplied to the manufacturing device. For example, the computer may slice a three-dimensional design into successive two-dimensional layers, and instructions representing each layer may be supplied to the additive manufacture machine, e.g. to control scanning of a laser across a powder bed to form the corresponding layer. Hence, in some embodiments rather than providing a physical heat exchanger component, the technique could also be implemented in a computer-readable data structure (e.g. a computer automated design (CAD) file) which represents the design of a radial flow turbine heat engine as discussed above). Thus, rather than selling the heat exchanger component in its physical form, it may also be sold in the form of data controlling an additive manufacturing machine to form such an engine. A storage medium may be provided storing the data structure.

Figure 2:
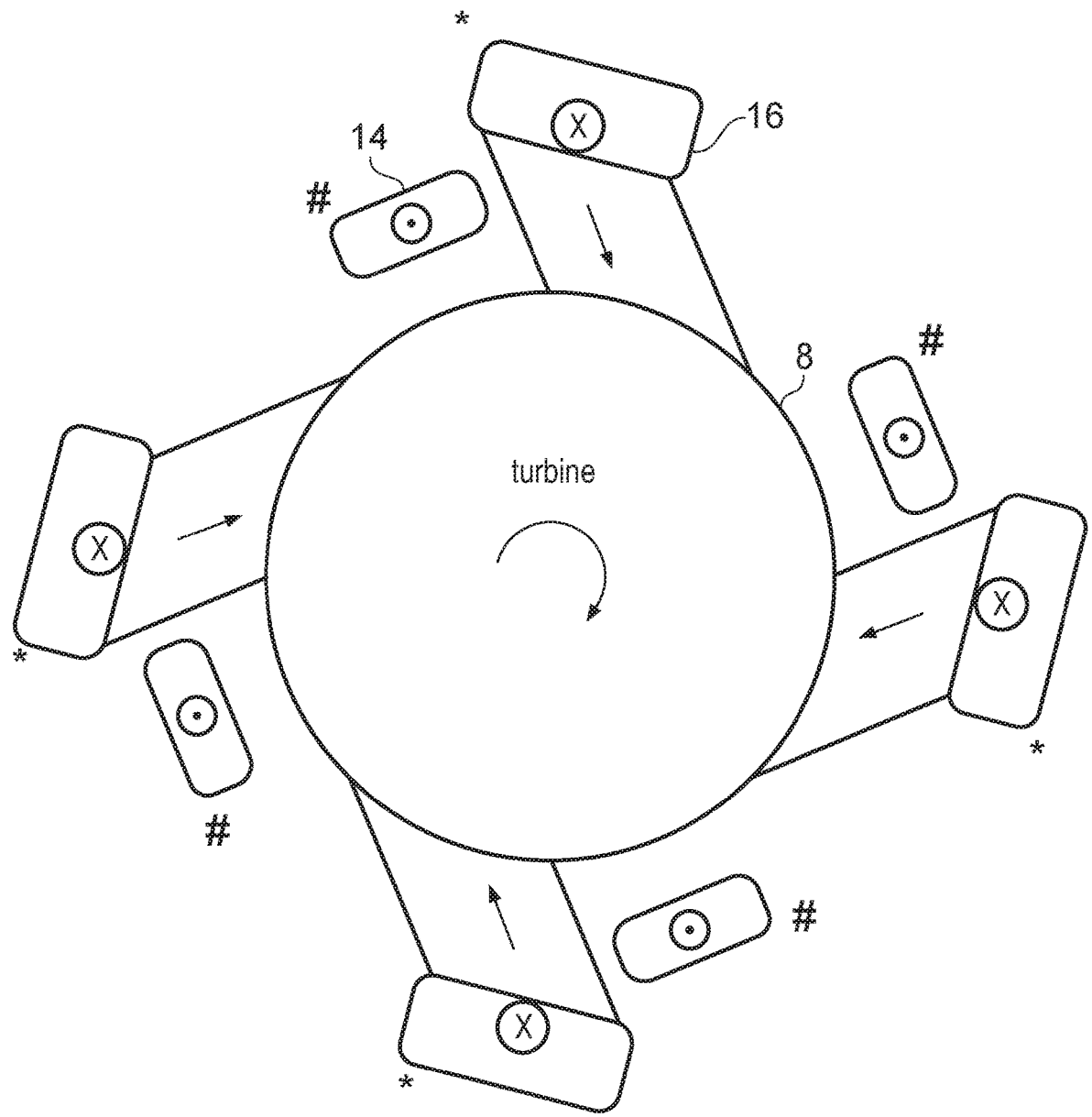
Figure 3:
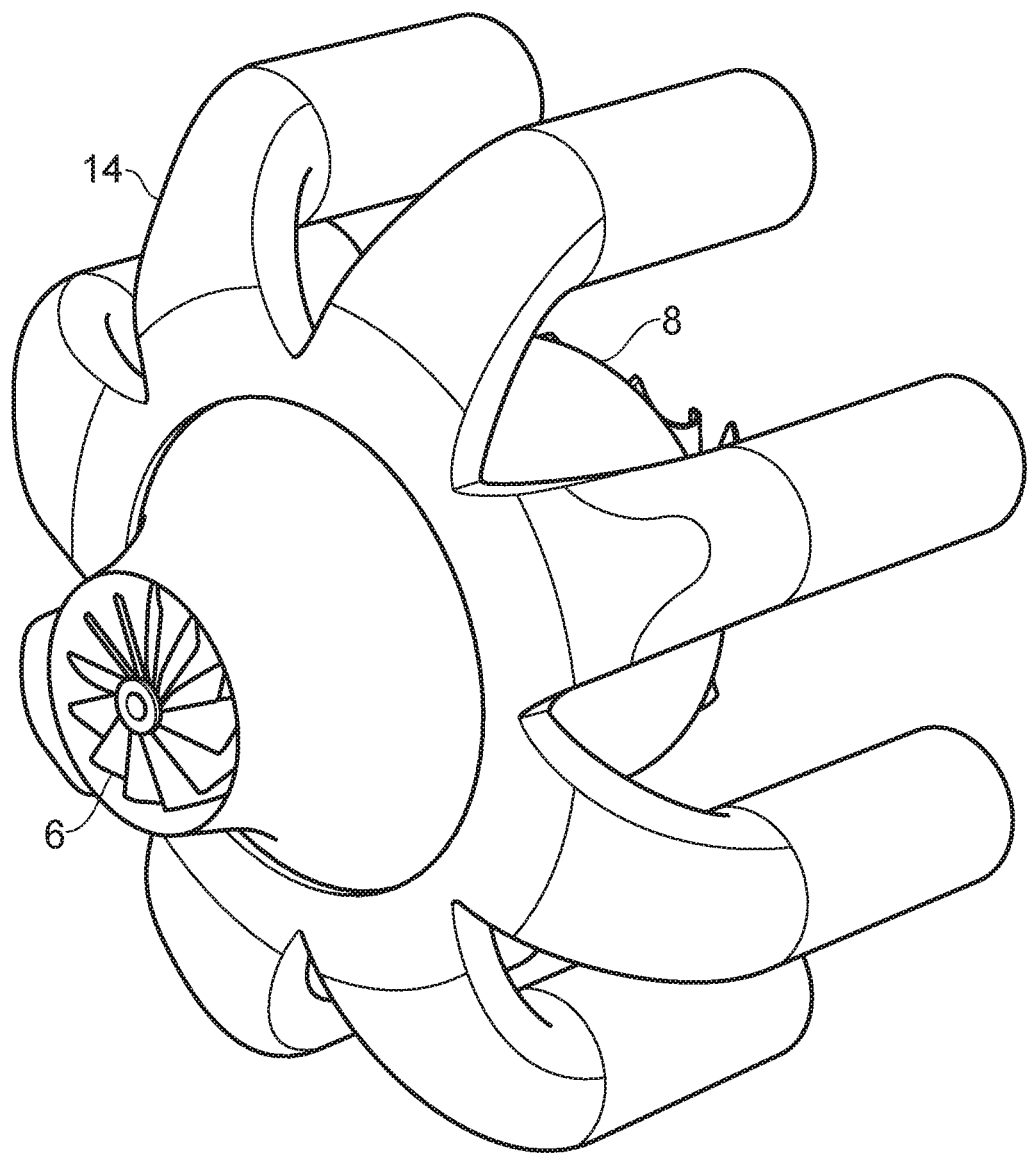
Figure 4:
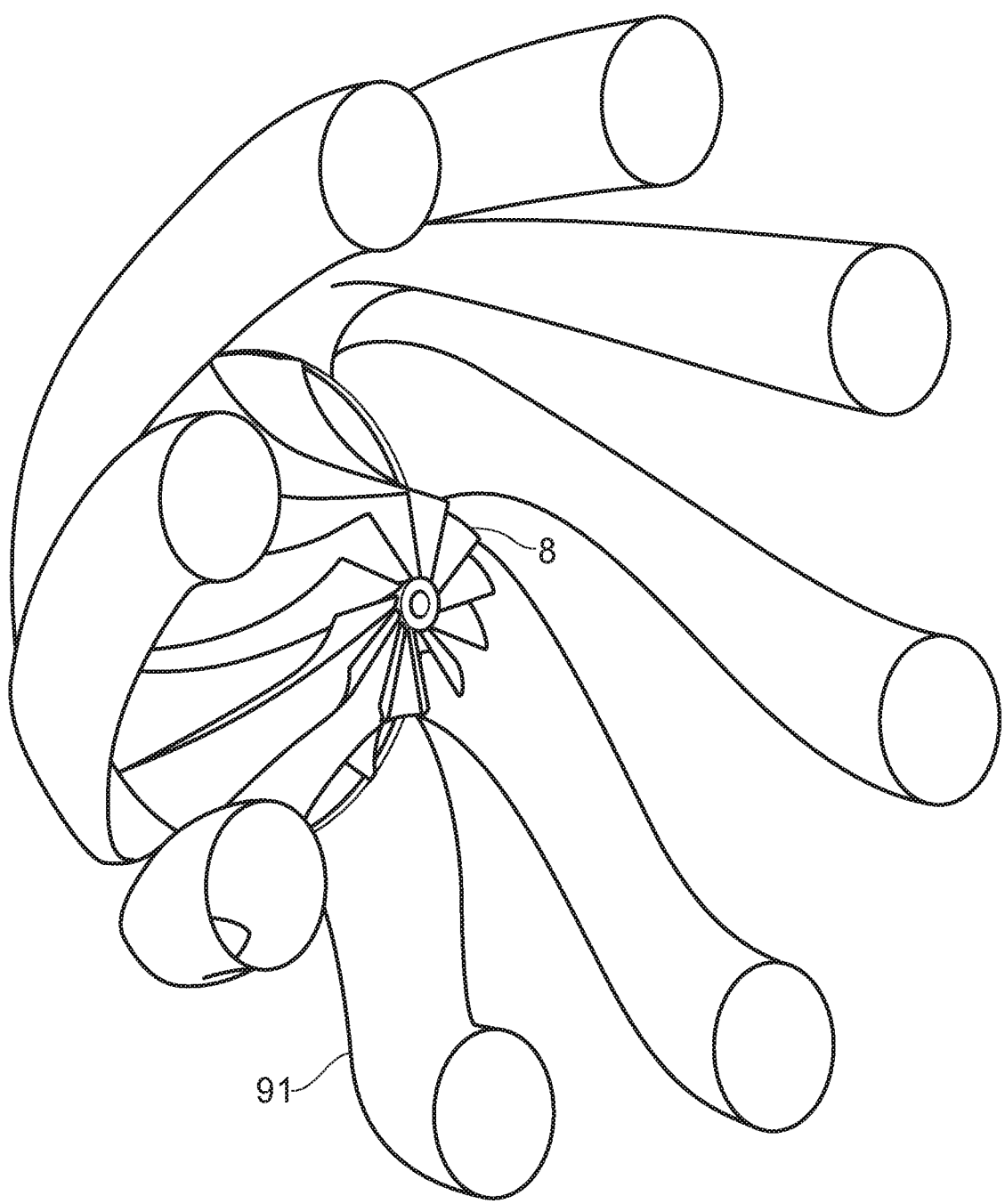

Example embodiments will now be described, by way of example only, with reference to the accompanying drawings in which:

FIG. 1 schematically illustrates a cross section through a radial flow turbine heat engine;

FIG. 2 schematically illustrates the crossover of compressor outlet manifold ducts and turbine inlet manifold ducts in a circumferential direction around a turbine;

FIG. 3 schematically illustrates one example of a compressor outlet manifold;

FIG. 4 schematically illustrates one example of a turbine inlet manifold.

FIG. 5 schematically illustrates ducting arrangements in both a cold portion and a hot portion of a heat engine.

FIG. 1 schematically illustrates a cross-section through a radial flow turbine heat engine 2. The radial flow turbine heat engine 2 includes a rotatable shaft 4 upon which are mounted a compressor 6 and a turbine 8. A load, such as an electrical generator, may be attached to the shaft 4. The radial flow turbine heat exchanger 2 also includes a recuperator 10, a combustor 12, a compressor outlet manifold 14 and a turbine inlet manifold 16. In operation rotation of the compressor 6 and the turbine 8 at high speed upon the shaft 4 draws in intake gas into the compressor 6 where it is compressed to form compressed gas. This compressed gas passes through compressor outlets 18 into the compressor outlet manifold 14. The flow of compressed gas out from the compressor 6 has a radial component outward from the shaft 4 and a rotational component around the shaft 4. The compressor outlet manifold 14 comprises a plurality of compressor outlet manifold ducts circumferentially arranged around the compressor 6 (e.g. in a plane perpendicular to the shaft 4). These compressor outlet manifold ducts are aligned so that each central axes corresponds to the direction of fluid flow of the compressed gas out through respective corresponding compressor outlets 18. The compressor outlet manifold ducts can thus serve as a diffuser for collecting the compressed gas from the compressor 6 and so avoid the need to provide a separate compressor diffuser within the radial flow turbine heat engine 2. The action of the combustion outlet manifold ducts in the place of a separate compressor diffuser at this point in the system may be enhanced by the provision of flow directing vanes, or other flow directing structures, within at least the first portion of the compressor outlet manifold ducts.

The compressed gas flows through the compressor outlet manifold ducts and passes between turbine inlet manifold ducts of the turbine inlet manifold 16. Thus, the compressor outlet manifold ducts and the turbine inlet manifold ducts are interdigitated (e.g. alternate in sequence, or follow some other sequence by which they are mixed in order, progressing around the radial flow turbine heat engine 2. The compressed gas thus is able to be routed radially inward of the flow path of the combustion gas in the hot portion of the radial flow turbine heat engine 2, i.e. in the portion comprising the turbine 8, the recuperator 10, the combustor 12 and a diffuser 20.

The compressor outlet manifold ducts may pass through a turbine casing 22 disposed around the turbine 8. Alternatively, the compressor outlet manifold ducts may be fixed to the outer surface of the turbine casing 22 so as to abut the turbine casing 22. In either case, the compressed gas flowing through the turbine casing 22, or through the ducts in contact with the turbine casing 22, serves to cool the turbine casing 22 by absorbing heat therefrom and heating the compressed gas. The compressed gas within the compressor outlet manifold ducts when it has moved axially along the shaft 4 beyond the turbine 8 is supplied into a recuperator 10 where it is further heated to form heated compressed gas. The further heating to form the heated compressed gas within the recuperator 10 may be achieved by heat exchange with exhaust gas which is also routed through the recuperator 10 in different channels (i.e. the recuperator 10 is a heat exchanger) and additionally by conduction of heat from the diffuser 20 into the recuperator 10.

The diffuser 20 contains exhaust gas from the turbine 8 and the high temperature of this exhaust gas results in the diffuser 20 becoming hot and some of this energy can be recovered into the heated combustion gas by the recuperator 10. The recuperator 10 may have an annular shape and completely surround the diffuser 20. In other possible embodiments, the recuperator 10 may be formed as a plurality of separate recuperator portions disposed around the circumference of the diffuser 20. In this case, a plurality of separate combustor portions may be disposed around the circumference of the diffuser in the gaps between the recuperator portions. In the example illustrated in FIG. 1, the combustor 12 is disposed at an outlet portion of the recuperator 10 which is distal from the turbine 8 (furthest from the turbine 8). The flow of gas out of the recuperator 10 may be controlled by controlling the duct shape within at least the final portion of the recuperator 10 to impart swirl in the flow of gas so as to assist in efficient combustion of fuel injected into the combustor 12.

The heated compressed gas exiting the recuperator 10 enters the combustor 12 where it is mixed with fuel (e.g. a combustible liquid or gas) and serves to support combustion so as to generate high temperature combustion gas which is directed out from the combustor 12 and flows through the turbine inlet manifold 16 to enter the turbine 8 at turbine inlets 24. The combustor 12 may be annular in shape and completely surround the diffuser 20 so as to absorb heat therefrom in a manner which further heats the combustion gas. Lagging (insulation) may be provided around the exterior of the turbine inlet manifold 16 as heat passing into the compressed gas and the combustion gas within this lagged portion will assist in increasing heat energy recovery in the radial flow turbine heat engine 2.

The combustion gas flowing back through the turbine inlet manifold 16 towards the turbine 8 first passes in a direction with a component parallel to the axis of the shaft 4 toward the turbine 8 and the compressor 6 before turning radially inward to crossover with the compressor outlet manifold ducts before reaching the turbine inlets 24.

As previously mentioned, the turbine inlet manifold ducts and the compressor outlet manifold ducts are circumferentially interdigitated so that they are able to crossover one another such that the flow path for the combustion gas to the turbine inlets 24 is located radially inward with respect to the shaft 4 relatively to the flow paths for the compressed gas which are proximal to the turbine inlets 24, i.e. at the turbine inlets 24, the turbine inlet manifold ducts (or the turbine inlet nozzles which are an integral part of the turbine inlet manifold ducts) are radially inward of the compressor outlet manifold ducts.

The turbine inlet manifold ducts may be aligned with their central axis in a direction so as to serve as nozzles for injecting the combustion gas into the turbine 8. This may avoid the need separately to provide nozzles to inject the combustion gas into the turbine 8. The action of the turbine inlet manifold ducts serving as nozzles may be enhanced by the provision of vane, or other flow directing structures, within the portion of the turbine inlet manifold ducts close to the turbine inlets 24.

The combustion gas entering the turbine 8 is expanded as it passes through the turbine 8 to extract work therefrom and then passes as exhaust gas into the diffuser 20. The turbine 8 thus drives the rotation of the compressor 6 and any load attached to the shaft 4. The exhaust gas entering the diffuser 20 is expanded so as to reduce its speed and increase its static pressure. The exhaust gas is then directed to flow through the recuperator 10 where the heat from the exhaust gas heats the compressed gas from the compressor 6 prior to the heated compressed gas reaching the combustor 12. The use of the diffuser 20 facilitates establishing a greater pressure drop across the turbine 8 enabling more work to be extracted from the combustion gas whilst having the exhaust gas at a pressure suitable for discharge to the atmosphere.

The arrangement by which the compressor outlet manifold ducts cross the turbine inlet manifold ducts is one in which there is a constraint of available space, i.e. the ducts of one manifold must pass in the gaps available between the ducts of the other manifold. In order to avoid a disadvantageous increase in size of the radial flow turbine heat engine 2, it is desirable that the compressor outlet manifold ducts and the turbine inlet manifold ducts should not extended radially outwardly too far from the shaft 4. Thus, more space may not simply be made by routing the ducts radially further out from the shaft 4 without paying a penalty of increasing the overall size and weight of the radial flow turbine heat engine 2. Thus, within the context of the confined dimensions within which the ducts of one manifold must cross with the ducts of another manifold, the overall flow resistance of gas through the system may be improved when the compressor outlet manifold ducts have a total cross sectional area that is less than the turbine inlet manifold ducts. The hotter combustion gas within the turbine inlet manifold ducts requires a greater cross sectional area to flow for a given flow resistance than does the cooler compressed gas within the compressor outlet manifold ducts.

The compact form of the radial flow turbine heat engine 2 may be exploited to achieve manufacturing and cost advantages by integrally forming the recuperator 10, the combustor 12, the turbine inlet manifold 16, and at least a portion of the compressor outlet manifold 14, for example these elements may be formed with a common wall. For example, these elements may be formed of consolidated material, e.g. by additive manufacture using energy beam melting of metal powder in a powder bed 3D printer. These integrally formed portions are all within the hot portion of the radial flow turbine heat engine 2 and accordingly it may be appropriate to use a material such as a titanium alloy. In the cold portion of the radial flow turbine heat engine 2 comprising the compressor housing and at least a portion of the compressor outlet manifold 14, a different less expensive metal, such as an aluminum alloy, may be used. The two portions of the turbine may then be fastened together.

FIG. 2 schematically illustrates an example cross section through the radial flow turbine heat engine 2 of FIG. 1 along the line A-A. In this example, the turbine inlet manifold ducts and the compressor outlet manifold ducts are shown with a 1:1 interdigitation. It will be appreciated that other interdigitated arrangements are also possible, such as a pair or turbine inlet manifold ducts being followed by a pair of compressor outlet manifold ducts as the circumference of the turbine 8 is traversed in a 2:2 interdigitation. It is also possible that the number of turbine inlet manifold ducts need not equal the number of compressor outlet manifold ducts. For example, there may be twice as many turbine inlet manifold ducts as compressor outlet manifold ducts and the interdigitation could be a pair or turbine inlet manifold ducts followed by a single compressor outlet manifold duct and then another pair or turbine inlet manifold ducts in sequence to provide a 2:1 interdigitation. As illustrated in FIG. 2 the cross-sectional areas of the turbine inlet manifold ducts are greater than the cross sectional areas of the compressor outlet manifold ducts. The relatively hot compressed gas requires more space to flow through for a given degree of flow resistance than does the relatively cool compressed gas. In other embodiments such a relationship between the cross-sectional areas may not be provided and higher flow velocities with a higher flow resistance tolerated.

It will be appreciated that FIG. 2 schematically illustrates the interdigitation and in practice the turbine inlet manifold ducts and the compressor outlet manifold ducts will typically be more tightly fitted against one another with relatively little free space therebetween so as to reduce the overall size of the radial flow turbine heat engine 2.

FIG. 3 schematically illustrates a compressor outlet manifold 14. In this example eight compressor outlet manifold ducts are formed which first flow radially outwardly from the shaft of the compressor 6 and then pass in a direction substantially parallel to the shaft of the compressor 6 toward the turbine 8. With eight separate compressor outlet manifold ducts, there is an angle of approximately 45 degrees between each of these compressor outlet manifold ducts when measured around the circumference of the old manifold. The gaps between the compressor outlet manifold ducts used to route turbine inlet manifold ducts from a radially outer position outside of the compressor outlet manifold ducts through the gaps between those compressor outlet manifold ducts and to the turbine inlets of the turbine 8 where they serve as nozzles to inject the combustion gas into the turbine 8.

FIG. 4 schematically illustrates a turbine inlet manifold 16 for the turbine 8. Again there are eight turbine inlet manifold ducts with one provided for each 45 degrees of rotation around the circumference of the turbine 8. These eight turbine inlet manifold ducts may be interdigitated with the eight compressor outlet manifold ducts of FIG. 3 by providing an approximately 22.5 degree rotational offset between the manifolds 14, 16.

FIG. 5 schematically illustrates a view of a heat engine 2 including a hot portion (darker shading and on left hand side) and a cold portion (lighter shading and on right hand side). The recuperators 10 are located between the combustors 12 underneath the open-ended (in practice an annular collector may be used) exhaust ducts 26. Ducts 28 take the heated compressed gas from the recuperators 10 and then pass this to the combustors 12.

Some example embodiments need not include a turbine diffuser and so produce a more compact heat engine at the cost of a decrease in efficiency. In such embodiments, the recuperator may be wrapped around the turbine casing to absorb heat therefrom with the combustor located downstream of the recuperator. In such embodiments the recuperator is in place of/does the job of the diffuser.

We claim:

1. A radial flow turbine heat engine comprising:
   a shaft;
   a compressor coupled to said shaft to compress intake gas to form compressed gas;
   a recuperator to heat said compressed gas to form heated compressed gas;
   a combustor to mix said heated compressed gas with fuel and to combust said fuel and said heated compressed gas to form combustion gas;
   a turbine coupled to said shaft to expand said combustion gas to form exhaust gas;
   a compressor outlet manifold to collect said compressed gas from said compressor through a plurality of compressor outlets; and
   a turbine inlet manifold to supply said combustion gas to said turbine through a plurality of turbine inlets; wherein
   said compressor outlet manifold comprises a plurality of compressor outlet manifold ducts connected to said plurality of compressor outlets;
   said turbine inlet manifold comprises a plurality of turbine inlet manifold ducts connected to said plurality of turbine inlets;
   said plurality of compressor outlet manifold ducts are circumferentially interdigitated with said plurality of turbine inlet manifold ducts around said shaft to provide:
   (i) flow paths for said compressed gas through said recuperator located radially inward with respect to a rotation axis of said shaft relative to flow paths for said combustion gas in a portion of said radial flow turbine heat engine proximal to said turbine; and
   (ii) flow paths for said combustion gas to said plurality of turbine inlets located radially inward with respect to said rotation axis relative to flow paths for said compressed gas proximal to said plurality of turbine inlets; and
   at least one of the plurality of turbine inlet manifold ducts extends radially outward from the combustor with respect to the rotation axis.

2. A radial flow turbine heat engine as claimed in claim 1, comprising a turbine diffuser to receive said exhaust gas from said turbine and to expand said exhaust gas, wherein said recuperator abuts and at least partially surrounds said turbine diffuser to receive heat therefrom and is located radially inward with respect to said rotation axis relative to said flow paths for said combustion gas.

3. A radial flow turbine heat engine as claimed in claim 2, wherein said recuperator receives said exhaust gas from said turbine diffuser and transfers heat from said exhaust gas to said compressed gas to form said heated compressed gas.

4. A radial flow turbine heat engine as claimed in claim 2, wherein said recuperator is annular and completely surrounds said diffuser.

5. A radial flow turbine heat engine as claimed in claim 2, wherein said recuperator comprises a plurality of separate recuperator portions disposed around a circumference of said turbine diffuser and combustor comprises a plurality of separate combustor portions disposed around said circumference of said turbine diffuser between said recuperator portions.

6. A radial flow turbine heat engine as claimed in claim 2, wherein said combustor is annular, surrounds said turbine diffuser and receives said heated compressed gas from a portion of said recuperator that is distal from said turbine.

7. A radial flow turbine heat engine as claimed in claim 2, wherein said combustor is disposed proximal to an output end of said turbine diffuser.

8. A radial flow turbine heat engine as claimed in claim 1, wherein said turbine comprises a turbine casing and at least some of said compressor manifold outlet ducts pass through said turbine casing to transfer heat from said turbine casing to said compressed gas.

9. A radial flow turbine heat engine as claimed in claim 1, wherein said turbine comprises a turbine casing and at least some of said compressor manifold outlet ducts abut said turbine casing to transfer heat from said turbine casing to said compressed gas.

10. A radial flow turbine heat engine as claimed in claim 1, wherein said compressor outlet manifold ducts direct said compressed gas to flow radially outwardly from said shaft and then away from said compressor and toward said turbine.

11. A radial flow turbine heat engine as claimed in claim 1, wherein said turbine inlet manifold ducts direct said combustion gas to flow with a component parallel to said shaft and toward compressor and said turbine and then radially inwardly toward said shaft.

12. A radial flow turbine heat engine as claimed in claim 1, wherein around a circumference at which said compressor outlet manifold ducts and said turbine inlet manifold ducts cross in a radial direction relative to said shaft, said compressor outlet manifold ducts have a total cross sectional area less than that of said turbine inlet manifold ducts.

13. A radial flow turbine heat engine as claimed in claim 1, wherein said compressor outlet manifold ducts have central axes at said compressor outlets aligned with a direction of outflow of said compressed gas having a rotational component around said shaft in a direction corresponding to a rotation direction of said compressor.

14. A radial flow turbine heat engine as claimed in claim 13, wherein said compressor outlet manifold ducts serve as a diffuser to collect said compressed gas from said compressor.

15. A radial flow turbine heat engine as claimed in claim 1, wherein said turbine inlet manifold ducts have central axes at said turbine inlets aligned to provide a direction of inflow of said combustion gas having a rotational component around said shaft in a direction corresponding to a rotation direction of said turbine.

16. A radial flow turbine heat engine as claimed in claim 1, wherein said turbine inlet manifold ducts serve as nozzles to inject said combustion gas into said turbine.

17. A radial flow turbine heat engine as claimed in claim 1, wherein flow ducts through said recuperator are shaped such that heated compressed gas output from said recuperator and input to said combustor has a swirl component of flow.

18. A radial flow turbine heat engine as claimed in claim 1, wherein said recuperator, said combustor, said turbine inlet manifold and at least a portion of said compressor outlet manifold are integrally formed.

19. A radial flow turbine heat engine as claimed in claim 18, wherein said recuperator, said combustor, said turbine inlet manifold and at least a portion of said compressor outlet manifold are formed of consolidated material.

20. A computer-readable data structure representing a design of the radial flow turbine heat engine as claimed in claim 1.

21. A non-transitory, computer-readable storage medium storing a computer-readable data structure representing a design of the radial flow turbine heat engine as claimed in claim 1.

* * * * *